United States Patent
Kinniard

[11] Patent Number: 5,891,237
[45] Date of Patent: Apr. 6, 1999

[54] PRODUCTION OF FREE FLOWING SPHERES USING PARTIALLY NEUTRALIZED FATTY ACID

[75] Inventor: Stephen Phillip Kinniard, Eaton, Australia

[73] Assignee: Millennium Inorganic Chemicals, Ltd., Australind, Australia

[21] Appl. No.: 946,765

[22] Filed: Oct. 8, 1997

[51] Int. Cl.[6] .................................................. C08K 5/00
[52] U.S. Cl. ........................ 106/505; 106/425; 106/436; 106/437; 106/450; 106/451; 106/452; 106/453; 106/405; 106/456; 106/461; 106/479; 106/480; 106/481
[58] Field of Search ................................. 106/425, 436, 106/437, 450, 451, 452, 453, 455, 456, 461, 479, 480, 481, 505

[56] References Cited

U.S. PATENT DOCUMENTS

| | | | |
|---|---|---|---|
| 1,722,174 | 7/1929 | Booge et al. | 106/421 |
| 3,042,539 | 10/1962 | Csonka et al. | 106/429 |
| 3,348,959 | 11/1967 | Csonka et al. | 106/419 |
| 3,506,466 | 4/1970 | Bramekamp et al. | 106/445 |
| 4,104,229 | 8/1978 | Sekmakas et al. | 524/497 |
| 4,165,239 | 8/1979 | Linden et al. | 106/448 |
| 4,186,028 | 1/1980 | Woditsch et al. | 106/447 |
| 4,222,789 | 9/1980 | Jacobson | 106/441 |
| 4,224,080 | 9/1980 | Chambers et al. | 106/439 |
| 4,255,375 | 3/1981 | Macpherson et al. | 264/117 |
| 4,277,288 | 7/1981 | Lawrence et al. | 106/413 |
| 4,283,316 | 8/1981 | Bonsignore | 106/504 |
| 4,375,989 | 3/1983 | Mäkinen | 106/438 |
| 4,563,221 | 1/1986 | Humphreys | 106/448 |
| 4,687,789 | 8/1987 | Gonnet et al. | 523/122 |
| 4,717,424 | 1/1988 | Wilfinger et al. | 106/404 |
| 4,786,369 | 11/1988 | Kanfer et al. | 252/120 |
| 4,842,651 | 6/1989 | Ravert et al. | 106/487 |
| 4,923,518 | 5/1990 | Brand et al. | 106/429 |
| 5,076,846 | 12/1991 | Buri et al. | 106/401 |
| 5,108,508 | 4/1992 | Rademachers et al. | 106/437 |
| 5,167,709 | 12/1992 | Shinohara et al. | 106/504 |
| 5,215,583 | 6/1993 | Kröckert et al. | 106/712 |
| 5,215,584 | 6/1993 | Buxbaum et al. | 106/712 |
| 5,270,076 | 12/1993 | Evers | 427/220 |
| 5,352,461 | 10/1994 | Feldstein et al. | 424/493 |
| 5,393,510 | 2/1995 | Blumel et al. | 423/610 |
| 5,449,402 | 9/1995 | Whalen-Shaw | 106/416 |
| 5,539,019 | 7/1996 | Suskind et al. | 523/201 |
| 5,543,135 | 8/1996 | Dahms | 424/59 |
| 5,634,970 | 6/1997 | Linde et al. | 106/437 |

FOREIGN PATENT DOCUMENTS

| | | |
|---|---|---|
| 148370 | 6/1961 | Hungary . |
| 60-221498 | 11/1985 | Japan . |
| 4000452 | 1/1992 | Japan . |
| 7247119 | 9/1995 | Japan . |
| 909220 | 10/1962 | United Kingdom . |
| 1548432 | 9/1976 | United Kingdom . |
| 2206339 | 5/1988 | United Kingdom . |

*Primary Examiner*—Mark. L. Bell
*Assistant Examiner*—Scott L. Hertzog
*Attorney, Agent, or Firm*—Kalow Springout & Bressler, LLP

[57] ABSTRACT

Spherical agglomerates of finely divided material such as inorganic oxides are prepared by admixing a slurry of finely divided material with a solution of a partially neutralised carboxylic acid.

31 Claims, 1 Drawing Sheet

200 MICRONS

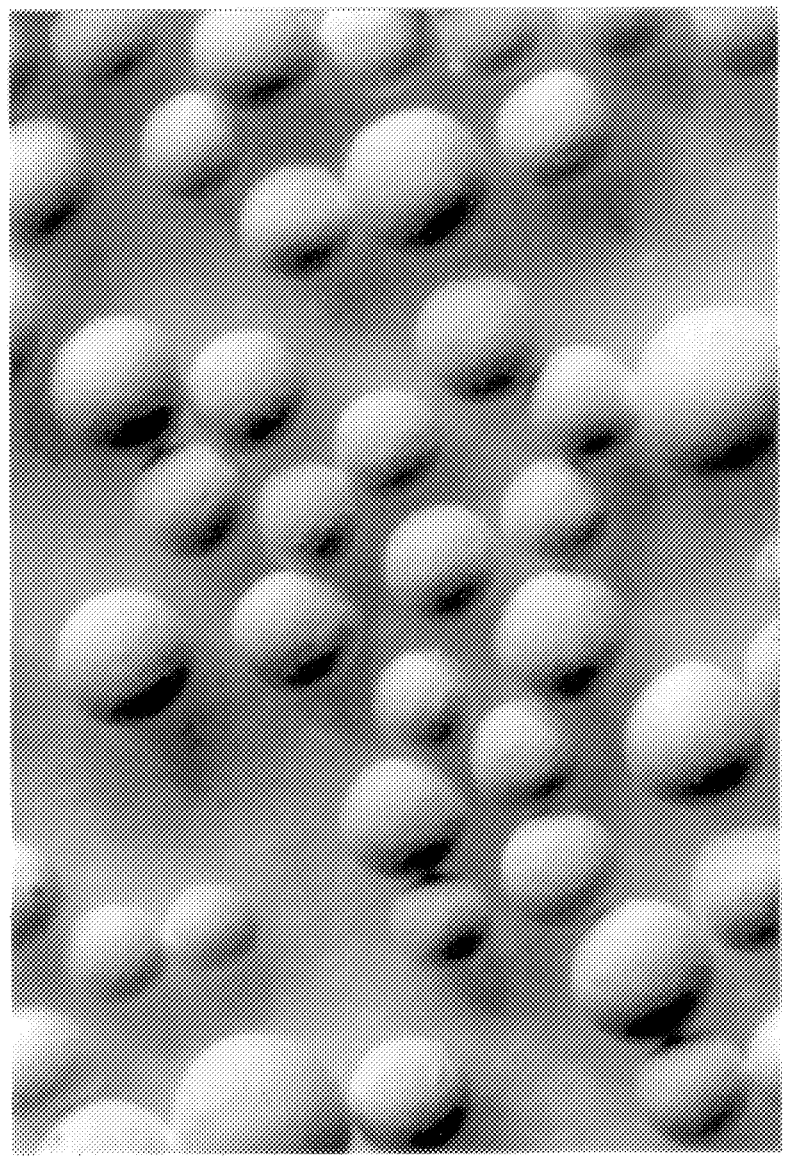
|←—|←— 200 MICRONS

PRODUCTION OF FREE FLOWING SPHERES USING PARTIALLY NEUTRALIZED FATTY ACID

BACKGROUND OF THE INVENTION

The present invention relates to the production of free-flowing spheres of solid particulate materials using partially neutralised carboxylic acids.

In producing and processing finely divided solid materials in dry form, it is desirable that the particles be substantially uniform in shape and size and that they be free-flowing. Various finely divided materials are required to be substantially dispersed in polymeric or liquid media. In such dispersions, the term "primary particles" refers to the individual crystals and tightly held aggregates thereof "Agglomerates" are larger associations of the primary particles. Ideally, a dispersion consists mainly of primary particles and a minimum of loosely held aggregates consisting of co-adhering primary particles. In contrast, when finely divided materials are processed in dry solid form, the particles can be larger, but are preferably uniform in shape and size so that they are free-flowing.

Powders consisting of such finely divided materials generally exhibit poor flow properties and readily generate undesirable levels of dust. Powders which are coated with hydrophobic agents which assist pigment wetting and dispersion in polymer systems can exacerbate problems such as dustiness. Poor flow characteristics result in difficulties achieving accurate flow metering. Excessive dustiness can cause problems with respect to industrial hygiene. Free-flowing aggregates overcome these problems. A weakness of current methods of producing free-flowing powders is that the aggregates are difficult to de-aggregate to primary pigment particles, which limits their applications. A further weakness of some methods used to produce free-flowing powders is that significant quantities of binders, up to 20% by weight with respect to the particulate material, are required.

Some free-flowing plastic grade pigments or fillers are commercially available. Due to the role of pigments such as titanium dioxide as opacifying agents, the primary pigment particles must be sub-micron in size. Free-flowing plastic grade pigments or fillers are available such as Tioxide's TR36 or Bayer's R-FK21; however, both of these grades suffer from a difficulty to deaggregate and disperse, which limits their usefulness. The present invention substantially overcomes this weakness.

U.S. Pat. No. 4,375,989 discloses titanium dioxide pigments whose dispersibility is improved by coating with an organic coating and also an inorganic coating. Organic substances used for coating include large-molecule fatty acids and their salts. Suitable inorganic coatings are oxides and hydroxides of aluminium, zinc, titanium, zirconium and magnesium.

U.S. Pat. No. 4,186,028 discloses aqueous fluid suspensions of fillers or pigments containing dispersion aids which can include phosphonocarboxylic acids and/or salts thereof.

U.S. Pat. No. 4,563,221 discloses pigments comprising particulate titanium dioxide having an organic coating of isostearic acid, dodecyl benzene sulphonic acid and a cationic emulsifying agent of a fatty alkyl amine. The pigment particles are described as free of inorganic coatings, and after treatment do not require milling in a fluid energy mill.

U.S. Pat. No. 1,722,174 proposed the use of alkali metal and ammonium salts of fatty acids for rendering lithopone (a mixture of zinc sulfide and barium sulfate) organophilic.

U.S. Pat. No. 3,042,539 discloses the use of alkali metal and ammonium salts of fatty acids for treating zinc oxide to produce organophilic pigments of very fine particle size.

U.S. Pat. No. 4,255,375 discloses the treatment of aqueous dispersions of organic pigments with at least one organic acid (such as octanoic) which is liquid at temperatures below 100° C., or a salt thereof, at a pH value at which the acid is water insoluble, maintaining the temperature above the melting point of the acid until the pigment has transferred into the organic phase, and then adding base to increase pH until the acid becomes water soluble. The amount of organic acid added to the pigment is greater than 10 weight percent of the resulting composition, based upon the disclosure of acid and salt as "from 0.1 to 4 parts . . . by weight per part of pigment." The pigment is recovered as spherical granules from 0.1 to 3mm in diameter.

U.S. Pat. No. 3,506,466 discloses titanium dioxide pigments, with or without inorganic coatings, which are treated with salts of water-soluble alkanolamines and oxycarboxylic acids and then milled in a fluid energy mill.

Hungarian Patent No 148,370 discloses organophilic oxide pigments prepared by adding an aqueous soap solution of an alkali metal or ammonium salt of a fatty acid (such as ammonium stearate) to an aqueous slurry of an oxide, such as titanium dioxide, then adding an acid such as HCl to adjust the pH to about 5.

U.S. Pat. No. 4,224,080 discloses inorganic oxide pigments (such as titanium dioxide) coated with alumina and treated with water soluble reaction products of excess di- or polybasic organic hydroxy acids with di- or polybasic alcohols.

British Patent No 909,220 discloses dry titanium dioxide pigments which are treated with water-soluble salts of organic (eg carboxylic) acids with tertiary amines. The treated pigments are said to disperse more easily in a vehicle and to exhibit a greater tendency to dry flow.

U.S. Pat. No. 4,786,369 discloses abrasive soap powders which can comprise titanium oxide particles coated with soaps formed by the reactions of organic acids with alkaline hydroxides or amines.

U.S. Pat. No. 4,923,518 discloses chemically inert pigmentary zinc oxide compositions prepared by wet treatment of chemically reactive zinc oxide base pigments which include the application of chemically inert organic or inorganic coatings. Such coatings can include water insoluble metallic soaps of a saturated or unsaturated monocarboxylic acid and/or various hydrous metal oxides. The pigment particles can be spherical or acicular in shape.

U.S. Pat. No. 4,277,288 discloses a process for producing a substantially dry, low dusting, free-flowing granular pigment composition by contacting a fluidised bed of pigment and a granulating assistant.

U.S. Pat. No. 5,215,583 discloses formation of granules from a suspension of one or more pigments wherein the suspension also contains 0.05 to 5% of a soluble salt, selected from alkali/alkaline earth metal chlorides, sulfates and phosphates.

U.S. Pat. No. 5,215,584 discloses a method for producing inorganic granules from a suspension of one or more inorganic pigmenting agents and a hydrolysed or poorly soluble compound of one or more ion types present per se as an essential constituent in one or more pigments.

U.S. Pat. No. 5,108,508 discloses a method for producing microgranules which are free-flowing and non-dust forming comprising providing an aqueous suspension of pigment which optionally contains from 0.1 to 0.9% by weight of binder and optionally contains from 0.1 to 2.0% by weight of silicone oil and spraying said suspension into a spray tower through a hollow cone nozzle. The binder is a sodium or ammonium polyacrylate, and the granules have a toroidal shape.

U.S. Pat. No. 5,634,970 discloses a granulating process comprising pretreating inorganic pigments by the addition of oils as binders and subjecting the pretreated pigment to a compacting stage to form flakes which are then broken down by rough grinding.

Many techniques have been developed for producing and processing such finely-divided materials, but in most cases they still lack uniformity as to size and, particularly shape, and hence are not as free-flowing as desired. Clearly there is room for improvement in this field.

Accordingly, an object of the present invention is to produce finely divided particulate materials such as pigments in which the particles are agglomerates substantially uniform in size and shape. Another object of the invention is to produce particles which are substantially free-flowing in bulk. A further object of the invention is to produce agglomerates of such finely divided materials which are substantially spherical in form. A further object of the invention is to produce free-flowing agglomerates which are sufficiently robust to survive manual handling whilst still being sufficiently soft to readily de-aggregate and disperse within the media into which the powder is to be incorporated.

SUMMARY OF THE INVENTION

In accordance with the present invention, it has been found that admixing a solution of a partially neutralised carboxylic acid with an aqueous slurry of a finely-divided solid material such as metal oxides produces spherical agglomerates of small, uniform size. After washing, dewatering and drying, the spheres retain their size and shape and produce a free-flowing powder. Micronising (i.e., processing in a fluid energy mill), normally needed to produce a readily dispersible finely-divided solid material such as a pigment, is not required. The invention provides a process for preparing spherical agglomerates of finely divided materials and, as a product, spherical agglomerates of finely divided material, preferably comprising a metal soap of a carboxylic acid. The product is durable in handling and shipment and also more dispersible in media than prior art products.

These and other objects, advantages and features of the invention will become apparent to those skilled in the art from perusing the following detailed description, including the appended claims and the figure.

BRIEF DESCRIPTION OF THE DRAWING

The sole FIGURE is a photomicrograph of substantially spherical titanium dioxide agglomerates prepared in accordance with the invention, at 50×magnification.

DETAILED DESCRIPTION OF THE INVENTION

In accordance with the invention, finely divided materials of various types which incorporate metal oxides can be formed into spherical agglomerates of substantially uniform size by admixing the materials, preferably in aqueous slurry form, with a solution of a partially neutralised carboxylic acid. It is important that the acids be only partially neutralised to provide a mixture of the carboxylic acid and a salt thereof, as experiments indicate that, surprisingly, neither the acids alone nor the completely neutralised acids (i.e., the salts alone) provide the desired effects.

Aqueous or non-aqueous solutions of the acids can be used. Slurries of finely divided materials admixed with the solutions of partially neutralised acids can be prepared by any suitable method, including the addition of a base to an acid solution, then admixing with the slurry; separate additions of the acid and its salt to form a partially neutralised acid in admixture with the slurry; and forming the partially neutralised acid in situ in the slurry by separate additions of the acid and base.

The invention has been demonstrated successfully with pigments such as titanium dioxide and is broadly applicable to metal oxides in general, as well as materials containing or coated with metal oxides. As mentioned below the method is particularly applicable to materials containing surface metal hydroxyl groups.

Since the agglomerates formed by the invention are to be used without further milling steps, which would destroy the agglomerates, the starting material should be free of large aggregates. A suitable starting material may require milling in a device such as a sand mill or fluid energy mill prior to treatment. Oversize aggregates may also be removed by steps such as hydro-classification or screening.

Whilst various metal oxides such as zinc oxide, titania or alumina are readily applicable to the invention, modification of the surface by means such as coating with a layer of alumina or other suitable metal oxide will generally render many other particulates amenable to the invention. Among such particulates are various minerals, inorganic pigments and fillers, clays, ceramic or refractory materials and the like.

Suitable metal oxides include those which form insoluble metal soaps with various carboxylate anions, and preferably have isoelectric points greater than about 5. Suitable metal oxides include, but are not limited to, oxides of metals such as aluminium, beryllium, cadmium, cerium, chromium, copper, lead, manganese, nickel, tin, zirconium, magnesium, iron, and zinc. The isoelectric points of these metals are listed in "The Isoelectric Points of Solid Oxides, Solid Hydroxides and Aqueous Hydroxo Complex Systems," by George A. Parks, *Chemical Reviews*, vol. 65(2), pp. 177–198 (1965), which is incorporated herein by reference. The invention is particularly effective with inorganic oxide pigments such as alumina, zirconia, magnesia, and titanium dioxide. The invention can be practiced on materials less than about one micron in average diameter, and is preferably practiced on pigments and fillers, having average particle sizes of about 0.01 to about 10 microns. The spherical agglomerates produced are preferably at least about 10 microns in diameter, most preferably from about 100 to about 500 microns in diameter.

The titanium dioxide particles particularly useful in the present invention include anatase and rutile crystalline forms and may be treated or coated, e.g., with one or more oxides or hydroxides of metals including aluminium, silicon, titanium, zirconium, magnesium, antimony, beryllium, cerium, hafnium, lead, niobium, tantalum, tin or zinc. The pigments of titania or other inorganic oxides can contain aluminium, introduced by any suitable method, including the co-oxidation of halides of titanium, (or other metal) and aluminium as in the "chloride process" or the addition of aluminium compounds prior to calcination in the "sulphate process". Aluminium compounds may also be added by precipitation of hydrated aluminium oxides onto the surface of the base crystal. Other metals whose oxides have sufficiently high isoelectric points, by which is meant greater than about 5, such as zinc, may be substituted for aluminium.

Partially neutralised solutions of suitable carboxylic acids may be used to treat finely divided materials in accordance with the invention. Suitable carboxylic acids can have from one to three acid groups and from 3 to about 18 carbon atoms. Preferred are "fatty acids", by which it is intended to include conventional fatty acids (i.e., saturated or unsaturated monocarboxylic acids having from 3 to about 18 carbon atoms), resin acids (i.e., acids found in resins occurring in the oleoresin of pine trees or in a tall oil produced as a by-product in the Kraft paper industry) and naphthenic acids. Carboxylic acids are discussed in Kirk-Othmer's *Concise Encyclopedia of Chemical Technology*, (John Wiley and Sons, New York, 1985), pp 217–219, which pages are incorporated herein by reference. Preferably the acids are saturated or unsaturated monocarboxylic acids having from 3 to about 18 carbon atoms, more preferably from 4 to about 12 carbon atoms, and most preferably from about 6 to about 10 carbon atoms. A highly preferred material which as been effectively used with titanium dioxide is caprylic (octanoic) acid. The carboxylic acids employed should have a pKa (the negative logarithm of the acid's ionization constant) less than about 9, preferably from about 3 to about 9, and most preferably in the range of from about 3 to about 7, to provide the proper solubility characteristics. Mixtures of the various acids can be used.

To achieve the desired effect, the partially neutralised acid added to the slurry should be at least about 0.05 weight percent of the dry weight of the finely divided material, preferably from about 0.1 to about 10 weight percent, and most preferably from about 0.5 to about 2 weight percent. The amount of acid residue actually retained on the spherical agglomerate product should be at least about 0.05 weight percent of the dry weight of the finely-divided material, preferably from about 0.2 to about 1 weight percent. The acid should be at least about 5 mole percent neutralised, preferably from about 15 to about 99 mole percent. The acid should be neutralised to a pH between 3 and 8, more preferably to a pH from 4 to 7. The acids can be used with any suitable source of hydroxyl groups, preferably an ammonium or alkali metal hydroxide such as sodium hydroxide. In addition to hydroxyl sources, other Lewis bases such as amines, e.g., alkanolamines such as triethanolamine, can be used. Such amines include mono-, di- and trialkanolamines such as monoethanolamine, diethanolamine, morpholine and the like. Blends of various bases can be used.

The process of the invention includes a step of admixing an aqueous slurry of a finely divided material with an amount of a partially neutralised carboxylic acid effective to form spherical agglomerates. The partially neutralised acids can be prepared by any suitable method, such as admixing the appropriate amount of a base such as sodium hydroxide with an aqueous solution of a carboxylic acid. The slurry which the acid solution is to be added should be mixed with sufficient vigour to allow intimate mixing of the slurry and the added acid and to overcome the onset of slurry thickening immediately after addition of the acid solution. The degree of mixing will be dependent upon vessel and agitator design and will be readily apparent upon experimentation to those skilled in the art. The concentration of the slurry may affect the size of the beads formed, larger beads being formed from more concentrated slurries. The maximum slurry concentration will be determined by the viscosity which can be accepted, particularly after bead formation, to minimise undesirable shear forces on the beads once formed. A typical concentration range would be 500 to 700 grams per litre.

In the case of pigments such as titanium dioxide, the slurry may contain particles which have had no surface modification subsequent to crystal formation (oxidation in the chloride process or calcination in the sulphate process) and are referred to as raw pigments. Alternatively the particles may have some treatment or surface modification, e.g., by precipitating a coating of metal hydroxides, phosphates, silicates or the like. Such modified particles may optionally be washed, dried and milled in a process such as a fluid energy mill prior to reslurrying.

The pH of the slurry prior to addition of the partially neutralised carboxylic acid should be in the range of from about 4 to about 8. The acids are neutralised to a pH of between about 3 and about 8, preferably between about 4 and about 7. Upon addition of the partially neutralised acid to the slurry and allowing a suitable time for interaction and bead formation, the beads are optionally washed and dewatered, then dried. The dry cake consists of spherical agglomerates with sizes ranging from as low as 10 microns to 1000 microns or larger. Under optimum conditions of preparation, the agglomerates are substantially spherical and reasonably uniform in size and exhibit excellent flow properties. A key aspect of this invention is that although the agglomerates are sufficiently robust for normal material handling operations, they are sufficiently soft to readily deagglomerate under normal processing conditions, for example in twin screw extruders.

While not wishing to be bound by any theory, the mechanism of the process of the invention, pertaining at least to particles comprising inorganic oxides, can be rationalised as follows. The reaction between a carboxylic acid and an alkali proceeds as follows (reversible):

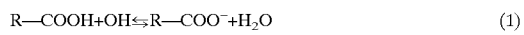

$$R\text{—}COOH + OH^- \rightleftharpoons R\text{—}COO^- + H_2O \quad (1)$$

(R is any suitable chemical group)

Admixing a solution of a partially neutralised soluble carboxylic acid with a finely-divided material such as a titanium dioxide pigment allows intimate contact of the water-soluble carboxylic acid salt with the pigment surface. The salt anion then can react with surface metal hydroxide groups of the pigment to produce a bound metal soap and releases a hydroxyl group, as shown in equation (2):

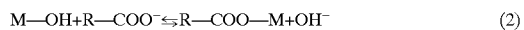

$$M\text{—}OH + R\text{—}COO^- \rightleftharpoons R\text{—}COO\text{—}M + OH^- \quad (2)$$

(M=metal)

Reaction (2), like reaction (1), is understood to be fully or substantially reversible, the equilibrium being affected by pH. Ordinarily, the liberation of hydroxyl groups would lead to a rise in pH and limit the number of carboxylic acid groups which can become attached to the pigment surface by the above reaction (2). However, the presence of un-neutralised acid acts as a buffer, the liberated hydroxyl from reaction (2) being consumed by the acid in reaction (1), producing more salt anions, which react with the free M—OH groups on the surface of the (M—OH) pigment.

The reaction continues in this sequence until either all the free acid is consumed or no further M—OH sites are available for reaction. The latter condition can be described as saturation of the M—OH (or other active) sites, and should be approached or attained to produce the desired hydrophobic surfaces on the particles.

Where insufficient free acid is available to saturate the pigment surface by formation of R—COO—M bonds as in reaction (2), bead formation can still occur by adsorption of R—COO⁻ groups to the pigment surface if a sufficient quantity of R—COO groups are attached, either chemically bound as R—COO—M or adsorbed as R—COO⁻ groups. Upon washing however, only those groups forming R—COO—M bonds are retained by the aggregates. Carbon analyses of washed, dewatered and dried samples show that the carbon content is equivalent to the non-neutralised component of the acid/acid salt mixture. The salt is removed upon washing and apparently acts essentially as a catalyst for reaction (2).

Due to the buffering effect of the acid/acid salt mixture, a significantly higher level of carboxylic acid groups can be attached to the pigment surface, forming a hydrophobic surface. This coverage by species which have a low affinity for water causes the pigment particles to clump together to reduce the total surface energy in the system. Minimising the amount of surface exposed per unit volume leads to a generally spherical shape for the agglomeration of the acid groups and the associated pigment particles. It appears that substantially all pigment particles become attached to the spherical agglomerates, and that upon drying, the spheres generally retain their shapes and produce a free flowing powder.

As illustrated in the figure and described in Example 6, the agglomerates are substantially spherical and reasonably uniform in size. By "substantially" spherical, it is meant that the agglomerates look spherical in appearance when magnified as in, e.g., the figure.

Thus it is believed that when the partially neutralised carboxylic acids contact inorganic oxides such as titania and alumina which have surface M—OH groups, bound or insoluble metal soaps form. By substantially saturating the active sites on the particles and creating hydrophobic surfaces thereon, this treatment causes spherical agglomerates to form. The treatment should be carried out in media substantially free of other anions which might preferentially form stable compounds on the surfaces of the particles. Example 11, for instance, illustrates that fluoride ion was able to block the octoate anion and prevent the formation of spherical agglomerates.

In most cases, the process of the invention is affected by surface charge phenomena, in which a positive surface charge on the particles treated attracts the negatively-charged acid anions. Each pigment or coating material, eg, inorganic oxides, has its own isoelectric point (the pH value at which the surface will have a neutral charge), hence the pH for the admixture of solid material and partially-neutralised acid must be adjusted to the level appropriate for the nature of the exposed surface to produce a positive surface charge.

Preferably the pigment or other solid material includes a component and/or surface coating comprising an elemental oxide whose isoelectric point is greater than about 5. Such materials include the oxides of metals such as aluminium, zinc, zirconium, beryllium, cadmium, cerium, chromium, copper, manganese, nickel, hafnium, lead, niobium, tantalum and tin. Whilst the acid anions will bond to positively charged sites such as alumina, they may not bond to negatively charged sites (under the range of pH values used) such as silica or phosphate. Too high a level of negatively charged sites will prevent sufficient coverage of the surface by acid groups to render the surface sufficiently hydrophobic to form beads. Coverage of these negatively charged sites with species such as aluminium may render the surface sufficiently positively charged to form beads upon addition of the acid/acid salt mixture. Too high a treatment level with, for example, aluminium hydroxides may make bead formation difficult due to the gelatinous nature of precipitated hydroxides which may bind particles so that they cannot readily separate into beads and also due to the larger number of hydroxyl groups which need to be removed to render the surface hydrophobic as in reaction (2). Therefore the nature of the pigment coating must be carefully considered before adding the partially neutralised acid.

The pH value of the partially neutralised carboxylic acids (and of the admixtures of slurry and acid, once combined) should be low enough to achieve a sufficient positive charge on the particles to attract the acid anions, yet sufficiently high to form insoluble metal soaps or other insoluble compounds upon the particle surface. Such pH levels will necessarily differ for various combinations of particle materials and acids. Generally, appropriate pH values will be in the range of from about 4 to about 8, and those skilled in the art can readily select effective pH values by experiment or prior experience.

The following examples set forth preferred embodiments of the invention. These embodiments are merely illustrative and are not intended to, and should not be construed to, limit the claimed invention in any way.

EXAMPLES

Example 1

Titanium dioxide pigment produced by the vapour phase co-oxidation of $TiCl_4$ and $AlCl_3$ to produce 1.09 percent by weight $Al_2O_3$ with respect to $TiO_2$ was sandmilled to produce an aqueous slurry of titanium dioxide referred to as "fines". The fines were screened through a 20 micron sieve.

2400g of $TiO_2$ fines in a total volume of 8 litres was heated to 85° C., and NaOH solution (200 grams per litre) added with mixing until a pH of 7.5 was attained. The neutralised fines were then dewatered and washed with 3.6 litres of demineralised water by vacuum filtration. This product was then repulped with demineralised water to form a slurry with a concentration of approximately 600 grams per litre.

18 grams of n-octanoic acid (BDH Laboratory Supplies, 99% minimum assay) was mixed in 500 mLs of demineralised water and ammonium hydroxide solution (28% $NH_3$) added until the pH of the solution was 7.0. This solution was then added to the repulped titanium dioxide pigment slurry under agitation. The slurry thickened initially, then commenced to thin out as beads formed. Within two minutes the titanium dioxide particles had agglomerated into spheres. All of the pigment particles were incorporated in the spheres as evidenced by the clear supernatant when agitation stopped.

The beads were transferred to a tray and dried at 105° C. Upon drying the cake readily collapsed to produce free flowing spheres averaging about 200 microns diameter.

Example 2

Example 1 was repeated, except the pH of octanoic acid solution was increased to 8 with ammonia instead of 7.

Upon addition of the ammonium octoate solution to the repulped titanium dioxide pigment slurry, the slurry thickened somewhat but did not form beads. Titration of octanoic acid with sodium hydroxide shows that at a pH of 7 approximately 90 mole percent of the acid has reacted, whereas at pH 8 neutralisation is essentially complete. Thus, completely neutralised acid is ineffective in forming spherical agglomerates.

Example 3

1100 g of titanium dioxide fines, heated, neutralised and washed as in Example 1, were repulped after vacuum dewatering with 1 litre of demineralised water. 11 grams of octanoic acid were added to the repulped fines. Some flocs (small masses formed in the fluid through coagulation or agglomeration of the fine suspended particles) were observed to form but the slurry retained a creamy consistency. Beads equivalent to those obtained in Example 1 did not form with the un-neutralised acid.

Example 4

1200 g of titanium dioxide fines in 4 litres of water were heated to 85° C. with stirring. Sodium aluminate solution equivalent to 0.2 percent $Al_2O_3$ based on weight of titanium dioxide was added to the fines, followed by sodium hydroxide solution to raise the pH to 7.5. The alumina-coated pigment slurry was washed on a vacuum filter with 1.8 litres of demineralised water. The washed and dewatered cake was repulped with 1 litre of demineralised water. Twelve grams of octanoic acid in 100 mLs of demineralised water was mixed with sufficient sodium hydroxide solution to neutralise 25 mole percent of the octanoic acid. The pH was 5.7. This solution was added to the washed, repulped titanium dioxide slurry. Beads readily formed after 1–2 minutes of mixing. The beads were dewatered and washed with 2.4 litres of demineralised water, then dried at 105° C. The dry cake readily collapsed to produce free-flowing spheres of titanium dioxide pigment approximately 100 microns in diameter.

Example 5

1200 grams of titanium dioxide fines in 4 litres of water were heated to 85° C. Sodium aluminate solution equivalent to 1 percent $Al_2O_3$ by weight on $TiO_2$ was added, followed by 200 grams per litre hydrochloric acid to achieve a pH of 8. The resulting slurry was washed with three litres of demineralised water. After dewatering, the filter cake was repulped with 600 mLs of demineralised water. Twelve grams of hexanoic acid in 50 mLs of demineralised water was dosed with sufficient sodium hydroxide to neutralise 17 mole percent of the acid. The pH was 5.3. The solution was added to the repulped titanium dioxide slurry. The resulting mixture thickened considerably and gradually thinned out over approximately 5 minutes. Beads were visible after this time. To complete the reaction with the hydroxyl groups of the pigments's coating, a further 6 grams of hexanoic acid with sufficient sodium hydroxide to neutralise 40 mole percent of the acid in 100 mLs of demineralised water was added to the titanium dioxide slurry and stirred for 30 minutes. The resultant mixture was dewatered and dried. The dry cake contained large beads approximately 1 mm in diameter.

Example 6

1200 grams of titanium dioxide fines in 4 litres of water were heated to 85° C., with NaOH added to raise the pH to 7.5 and resulting slurry washed with 1.8 litres of demineralised water. The resulting filter cake was repulped with 600 mLs of demineralised water. To twelve grams of hexanoic acid in 100 mLs of water was added 3.9 grams of triethanolamine. This solution (pH 5.0) was added to the repulped titanium dioxide. The slurry thickened and gradually thinned out after about 5 minutes stirring after which the slurry was very fluid. Beads of approximately 275 microns had formed. The mixture was dewatered then dried. The dry cake readily collapsed to a free flowing powder. The Figure, a photomicrograph of this material at 50×magnification, shows that the agglomerates are spherical and substantially uniform in size.

Example 7

1200 grams of titanium dioxide fines in 2 litres of water were neutralised to pH 7.5. To this slurry was added a solution of 9 grams of octanoic acid in 100 mLs of demineralised water to which sufficient sodium hydroxide solution was added to neutralise 20 mole percent of the acid. The pH was 5.6. Beads readily formed within about 1 minute of agitation. The resultant mixture was dewatered, then washed with 2.4 litres of demineralised water, dewatered and dried at 105° C. Three equivalent treatments were performed with the exception that the degree of neutralisation was 40,60 and 80 percent, respectively. The dried samples were analysed for carbon content, listed below in Table I.

TABLE I

| Degree of Neutralisation (mole %) | Carbon Content (wt %) | Equivalent Weight of Octanoic Acid (wt %) |
| --- | --- | --- |
| 20 | 0.36 | 0.54 |
| 40 | 0.30 | 0.45 |
| 60 | 0.20 | 0.30 |
| 80 | 0.12 | 0.18 |

It is seen that there is good agreement between the amount of organic retained by the pigment and the non-neutralised acid content. For example, with 40 percent neutralisation the total non-neutralised addition level is 60×0.75 percent (the total acid addition level)=0.45 percent, exactly the amount of organic retained by the pigment. The neutralised acid component is removed by washing. It was also observed that the samples with 20 percent and 40 percent neutralisation levels exhibited superior flow properties to the samples treated with 60 percent and 80 percent neutralised acid.

Example 8

1200 grams of titanium dioxide fines in 4 litres of water were heated to 85° C., neutralised to pH 7.5 with NaOH solution and washed with 1800 mLs of hot demineralised water. 16.8 grams of lauric acid in 500 mLs demineralised water (Prifrac 2922-1 supplied by Unichema International) which had been 25 mole percent neutralised with sodium hydroxide (pH=6.9) and heated to about 70° C. was added to a 4 litre beaker and the repulped titanium dioxide pulp added. The slurry flocculated and formed beads after approximately one-half to two-thirds of the pulp had been added to the beaker. The resultant mixture dewatered quickly. Although bead formation did occur, more satisfactory results were obtained with hexanoic or octanoic acid. The beads were approximately 25 to 75 microns in diameter.

Example 9

An aqueous slurry of titanium dioxide fines containing 1275 grams of $TiO_2$ at a concentration of approximately 600 grams per litre was raised to pH 5.8 with sodium hydroxide solution. Into 60 mLs of demineralised water containing 9.56 grams of octanoic acid under agitation was added 4 mLs of 200 grams per litre sodium hydroxide solution, producing a partially neutralized acid solution with a pH of 5.8. The resulting solution was added to the pigment slurry under agitation. The slurry thickened immediately, then quickly thinned out as beads formed. The resultant slurry was dewatered and washed with 2 litres of demineralised water, dewatered and dried at 110° C. Beads of approximately 300 microns diameter were formed.

Example 10

A treatment identical to example 9 was performed, with the exception that 2-ethyl hexanoic acid was used in place of octanoic acid. In this example, beads failed to form even after stirring for 16 hours. While not wishing to be bound by theory, it is believed that steric hindrance played a part in this case.

Example 11

To 1300 grams of titanium dioxide pigment fines in an aqueous slurry of 600 grams per litre concentration was added 5.2 grams of sodium fluoride, resulting in a pH of 7.0. Hydrochloric acid (200 gpL) was added to reduce the pH to 5.8. A solution containing 9.75 grams of octanoic acid which had been 30 percent neutralised with sodium hydroxide (pH=5.8) was then added to the pigment slurry. Beads did not form, presumably due to the presence of fluoride ions which effectively blocked the octoate anions from the pigment surface.

Example 12

1200 grams of titanium dioxide pigment fines in an aqueous slurry totalling 2 litres was neutralised to pH 5.85 with sodium hydroxide solution. 80 mLs of a solution containing nine grams of octanoic acid which had been 30 mole percent neutralised with sodium hydroxide (pH=5.8) was added to the pigment slurry, resulting in bead formation within one minute. After stirring for three minutes, a further 2.5 mLs of 200 gpL sodium hydroxide solution was then added to dissolve any excess free acid. After stirring for a further 20 minutes, the beads were dewatered, washed with 2.4 litres of demineralised water, dewatered and dried at 110° C. Beads with a diameter averaging about 225 microns were formed.

Example 13

Twelve grams of the beads produced in Example 12 were processed into 300 grams of black PVC to produce a grey mat on a Farrel two roll mill. Mats were also prepared using TR36 (Tioxide Group) and RFK2 1 (Bayer), two commercially available titania pigments with free flowing properties containing silicones. The mat produced using the product prepared in Example 12 was clean, whereas the mats produced using the two commercially available products contained significant numbers of undispersed aggregates. A good indication of the degree of pigment dispersion is to measure the brightness (L* value, as defined by Commission Int. de l'Eclariage 1976 using a Gardner Colorview Spectrophotometer) of the mats. The results are shown below in Table II:

TABLE II

| Pigment | L* |
|---|---|
| Example 12 | 53.8 |
| TR36 | 44.0 |
| RFK21 | 49.6 |

A higher L* value is indicative of higher tinting strength resulting from more efficient scattering of light due to a higher degree of pigment deaggregation and dispersion. The pigment produced in Example 12 is clearly superior for dispersion.

Upon reading the present application, various alternative constructions and embodiments will become apparent to those skilled in the art. These variations are to be considered within the scope and spirit of the present invention. The invention is only to be limited by the claims which follow, and their equivalents.

I claim:

1. Spherical free-flowing agglomerates comprising finely-divided metal oxide materials and at least one metal soap of a carboxylic acid.

2. The spherical agglomerates of claim 1 which are prepared by admixing an aqueous slurry of said finely-divided metal oxide material with a partially neutralised carboxylic acid.

3. The spherical agglomerates of claim 2 wherein said carboxylic acid is at least one saturated or unsaturated carboxylic acid having from 3 to about 18 carbon atoms.

4. The spherical agglomerates of claim 2 wherein said acid has a pKa of from about 3 to about 9.

5. The spherical agglomerates of claim 2 wherein said carboxylic acid is neutralised to a pH value in the range of from about 3 to about 8.

6. The spherical agglomerates of claim 5 wherein said carboxylic acid is at least about 5 mole percent neutralised.

7. The spherical agglomerates of claim 2 wherein said carboxylic acid is present as at least about 0.05 weight percent of said metal oxide material.

8. The spherical agglomerates of any of claims 2 to 7 wherein the neutralising agent is at least one Lewis base.

9. The spherical agglomerates of any of claims 1 to 8 wherein said metal oxide material is a titanium dioxide pigment.

10. The spherical agglomerates of claim 9 wherein said pigment contains aluminium.

11. The spherical agglomerates of claim 9 wherein said titanium dioxide pigment is coated with at least one metal oxide whose isoelectric point is greater than about 5.

12. The spherical agglomerates of claim 11 wherein said titanium dioxide pigment is coated with an oxide or hydroxide of aluminium.

13. The spherical agglomerates of any of claims 2 to 7 wherein said metal oxide material contains a metal whose oxide has an isoelectric point of at least about 5.

14. A process of preparing spherical free-flowing agglomerates of finely-divided materials containing at least one metal oxide, comprising steps of:

a) admixing an aqueous slurry of a finely divided material containing at least one metal oxide with an effective amount of a partially neutralised carboxylic acid to form said spherical agglomerates, b) optionally washing and/or dewatering the material, c) drying the material and d) recovering said spherical agglomerates.

15. The process of claim 14 wherein said finely-divided material is coated with at least one metal oxide which has an isoelectric point of at least about 5.

16. The process of claim 14 or 15 wherein said finely-divided material is a titanium dioxide pigment.

17. The process of claim 16 wherein said titanium dioxide pigment contains aluminium.

18. The process of claim 17 wherein said titanium dioxide pigment is coated with an oxide or hydroxide of aluminium.

19. The process of claim 14 or 15 wherein said slurry of finely-divided material is admixed with a solution of said partially neutralised carboxylic acid.

20. The process of claim 14 or 15 wherein said partially neutralised carboxylic acid is formed in situ by separate additions of said acid and a neutralising agent.

21. The process of claim 14 or 15 wherein said partially neutralised carboxylic acid is formed by separate additions of said acid and a salt thereof to said slurry.

22. The process of any of claims 14 or 15 wherein said partially neutralised carboxylic acid is at least about 5 mole percent neutralised.

23. The process of claim 22 wherein said carboxylic acid has a pKa in the range of from about 3 to about 9.

24. The process of any of claim 19 wherein said partially neutralised carboxylic acid has a pH value in the range of from about 3 to about 8.

25. The process of claim 14 wherein said partially neutralised carboxylic acid is neutralised with at least one Lewis base.

26. The process of claim 25 wherein said partially neutralised carboxylic acid is present in the admixture of (a) as from about 0.05 to about 10 weight percent of said finely-divided material.

27. The process of claim 26 wherein said partially neutralised carboxylic acid is at least one saturated or unsaturated carboxylic acid having from about 3 to about 18 carbon atoms.

28. The process of claim 27 wherein said partially neutralised carboxylic acid is present in an amount effective to saturate the surface metal hydroxyl sites present in said finely-divided material.

29. Spherical agglomerates of finely divided material prepared by a process of claim 14.

30. The process of claim 20 wherein said partially neutralised carboxylic acid has a pH value in the range of from about 3 to about 8.

31. The process of claim 21 wherein said partially neutralised carboxylic acid has a pH value in the range of from about 3 to about 8.

* * * * *

UNITED STATES PATENT AND TRADEMARK OFFICE
CERTIFICATE OF CORRECTION

| | |
|---|---|
| PATENT NO. | : 5,891,237 |
| DATED | : April 6, 1999 |
| INVENTOR(S) | : Stephen Phillip Kinniard |

It is certified that error appears in the above-identified patent and that said Letters Patent is hereby corrected as shown below:

Column 12, Claim 9, replace "8" with --7--.

Column 13, Claim 25, replace "14" with --24--.

Signed and Sealed this

Third Day of July, 2001

*Attest:*

NICHOLAS P. GODICI
*Attesting Officer*     *Acting Director of the United States Patent and Trademark Office*